(12) United States Patent  (10) Patent No.: US 8,929,706 B2
Teymouri  (45) Date of Patent: Jan. 6, 2015

(54) FIBER OPTIC CABLE STORAGE ENCLOSURE

(75) Inventor: Javad Teymouri, Suwanee, GA (US)

(73) Assignee: Cisco Technology, Inc., San Jose, CA (US)

( * ) Notice: Subject to any disclaimer, the term of this patent is extended or adjusted under 35 U.S.C. 154(b) by 422 days.

(21) Appl. No.: 12/550,439

(22) Filed: Aug. 31, 2009

(65) Prior Publication Data

US 2011/0052132 A1 Mar. 3, 2011

(51) Int. Cl.
*G02B 6/00* (2006.01)
*G02B 6/44* (2006.01)

(52) U.S. Cl.
CPC .................... *G02B 6/4441* (2013.01)
USPC ........................................ 385/135

(58) Field of Classification Search
CPC ........................................ G02B 6/444
USPC ........................................ 385/135
See application file for complete search history.

(56) References Cited

U.S. PATENT DOCUMENTS

| 3,861,556 | A | * | 1/1975 | Barecki et al. | 206/216 |
| 5,966,492 | A | | 10/1999 | Bechamps et al. | |
| 6,591,053 | B2 | | 7/2003 | Fritz | |
| 6,845,207 | B2 | | 1/2005 | Schray | |
| 7,359,609 | B2 | | 4/2008 | Mahoney et al. | |
| 7,409,138 | B1 | * | 8/2008 | Frazier et al. | 385/135 |
| 7,418,183 | B2 | | 8/2008 | Wittmeier et al. | |
| 7,471,867 | B2 | | 12/2008 | Vogel et al. | |
| 7,496,269 | B1 | | 2/2009 | Lee | |
| 2005/0129379 | A1 | | 6/2005 | Reagan et al. | |
| 2006/0280418 | A1 | | 12/2006 | Mahoney | |
| 2008/0170831 | A1 | * | 7/2008 | Hendrickson et al. | 385/135 |
| 2009/0103880 | A1 | * | 4/2009 | Clark et al. | 385/135 |
| 2009/0238531 | A1 | * | 9/2009 | Holmberg et al. | 385/135 |
| 2010/0329622 | A1 | * | 12/2010 | Kutsuzawa | 385/135 |

* cited by examiner

*Primary Examiner* — Eric Wong
(74) *Attorney, Agent, or Firm* — Patent Capital Group (57) ABSTRACT

In one embodiment a fiber optic storage enclosure (FOSE) includes a fiber tray configured for coupling with a fiber optic device having a connector and a cover movably coupled to the fiber tray configured for coupling with the fiber tray and the fiber optic device and movable between a closed condition to cover the connector of the fiber optic device and an open condition to allow access to the connector of the fiber optic device. The cover may serve as a shield to prevent injury from a laser of the fiber optic device and include a viewer to allow a user to view a portion of the fiber optic device when the cover is in a closed shielding position.

19 Claims, 12 Drawing Sheets

FIBER OPTIC CABLE STORAGE ENCLOSURE

TECHNICAL FIELD

The present disclosure relates generally to enclosures for fiber optic devices and cable, and more particularly, to enclosures for use with an optical network terminal (ONT).

BACKGROUND

Increasingly complex Cable Access Television (CATV) devices, such as ONTs having a variety of optical and/or radio frequency (RF) devices, are being installed in the home. The installation of an ONT can be difficult and time consuming, as a skilled technician not only installs the device, but also mounts the device to a wall and runs cables to and from the device. In addition, once the ONT is installed at the premises, it is often susceptible to tampering by a homeowner. Such tampering not only can degrade the performance of the ONT due to the high tolerances required for the components and the associated connections, but it can also leave the homeowner susceptible to injury by the laser. For example, a laser of an ONT may produce light of a wavelength that, although not visible by the human eye, may be harmful if a homeowner looks directly into a live fiber. It is thus desirable provides a means by which an ONT is easily and quickly installed, that protects the ONT from tampering, and provides increased protection from the laser.

OVERVIEW

In an example embodiment, a fiber optic storage enclosure (FOSE) comprises a fiber tray and a movable cover configured for coupling with a fiber optic device (FOD) to form a Fiber Optic Assembly (FOA). In the description of the example embodiments the FOSE may be shown in conjunction with an Optical Network Terminal (ONT) to form an ONT assembly. It should be noted, however, that the FOSE may be used in conjunction with other devices.

In an example embodiment, the tray of the FOSE is configured for mounting to a mounting surface, such as a wall or cabinet, and for removably coupling with the FOD housing. For example, the tray may be configured for mounting to a wall and for remvoably coupling to the bottom of a FOD housing to allow the FOD to be mounted to the wall or cabinet through the FOSE. The tray may include a fiber storage area configured for storing fiber for use with the FOD, the fiber storage area configured to be covered by the FOD. The tray may also include a splice area configured to extend in front of the FOD and provide cable to the FOD.

The cover of the FOSE may be coupled to the tray and movable between an open position and a closed position in which the cover engages and disengages the front of the FOD. In the closed condition the cover may cover connectors of the FOD and the splice area of the tray to prevent tampering with the FOD and cable. In addition, the cover may act as a shield to prevent the exposure to a laser.

The cover may also be configured to allow for the viewing of a portion of the FOD when the cover is in a closed position. For example, the cover may have a viewer opening that provides a line of sight to indicators of the FOD while the cover is in a closed condition that prevents access to the FOD connectors and shields the connectors and fiber optic cable used by the FOD. This arrangement allows a technician or homeowner to determine the status of the FOD without accessing the cable or exposing the cable or laser devices to access the FOD or expose the fiber or fiber connections. The cover may also be lockable to prevent tampering with the FOD and its connectors and thereby prevent possible injury from the fiber optic cable. The FOSE and the FOD together form an assembly that is easily installed and prevents tampering with the device while protecting users from possible injury from the laser.

DESCRIPTION OF EXAMPLE EMBODIMENTS

As required, exemplary embodiments of the present invention are disclosed. The various embodiments are meant to be non-limiting examples of various ways of implementing the invention and it will be understood that the invention may be embodied in alternative forms. The present invention will be described more fully hereinafter with reference to the accompanying drawings in which like numerals represent like elements throughout the several figures, and in which exemplary embodiment are shown. The figures are not to scale and some features may be exaggerated or minimized to show details of particular elements, while related elements may have been eliminated to prevent obscuring novel aspects. The specific structural and functional details disclosed herein should not be interpreted as limiting, but merely as a basis for the claims and as a representative basis for teaching one skilled in the art to variously employ the present invention. For example, while the exemplary embodiments are discussed in the context of a fiber optic device in the form of an ONT, it will be understood that the present invention is not limited to such fiber optic devices and may be used in conjunction with other devices.

Figure 1:
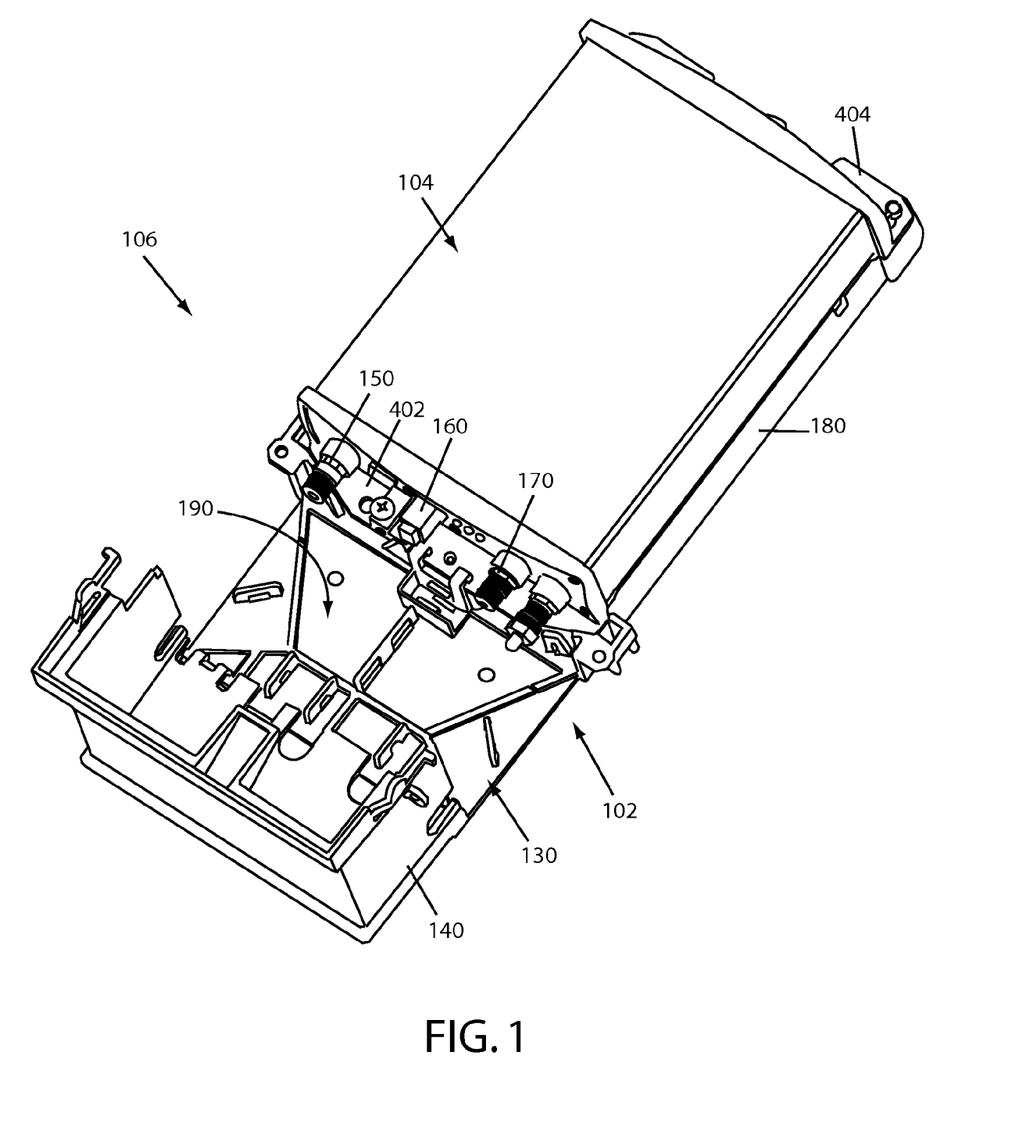
FIG. 1 illustrates an example Fiber Optic Storage Enclosure (FOSE) in use with a Fiber Optic Device (FOD) which a tray of the FOSE is in an open condition.
Figure 2:
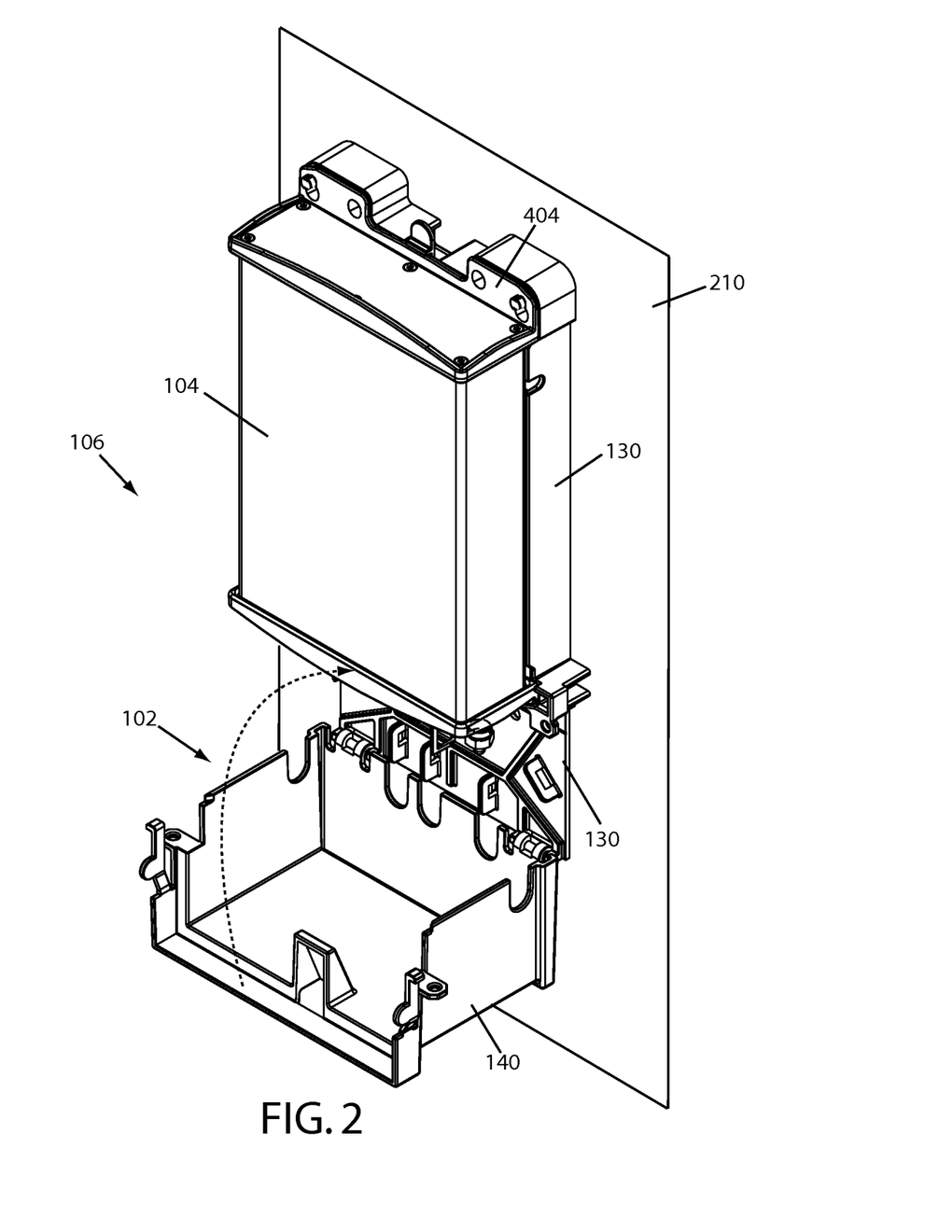
FIG. 2 illustrates an example embodiment of a FOSE coupled to a FOD and mounted to a mounting surface in which the tray of the FOSE is in an open condition.

Turning to the figures, FIG. 1 shows an example embodiment of a fiber optic storage enclosure (FOSE) 102 shown coupled with a Fiber Optic Device 104 in the form of an Optical Network Terminal (ONT), such as that provided by Cisco Systems, Inc to form a Fiber Optic Assembly 106. The FOSE 102 includes a tray 130 and a cover 140. As shown in FIG. 2, the tray 130 may be mounted to a mounting surface such as a wall 210 and the FOD 104 coupled to the tray 130.

Figure 3:
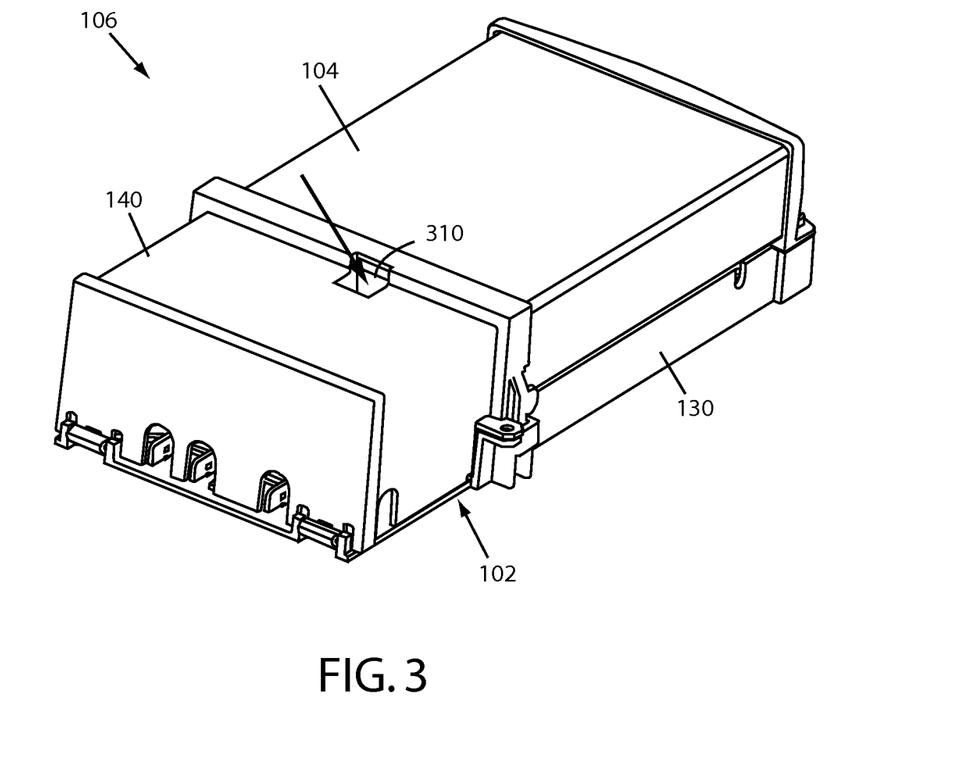
FIG. 3 illustrates a perspective view of a FOSE in use with a FOD in which a tray of the FOSE s in a closed position.
Figure 4:
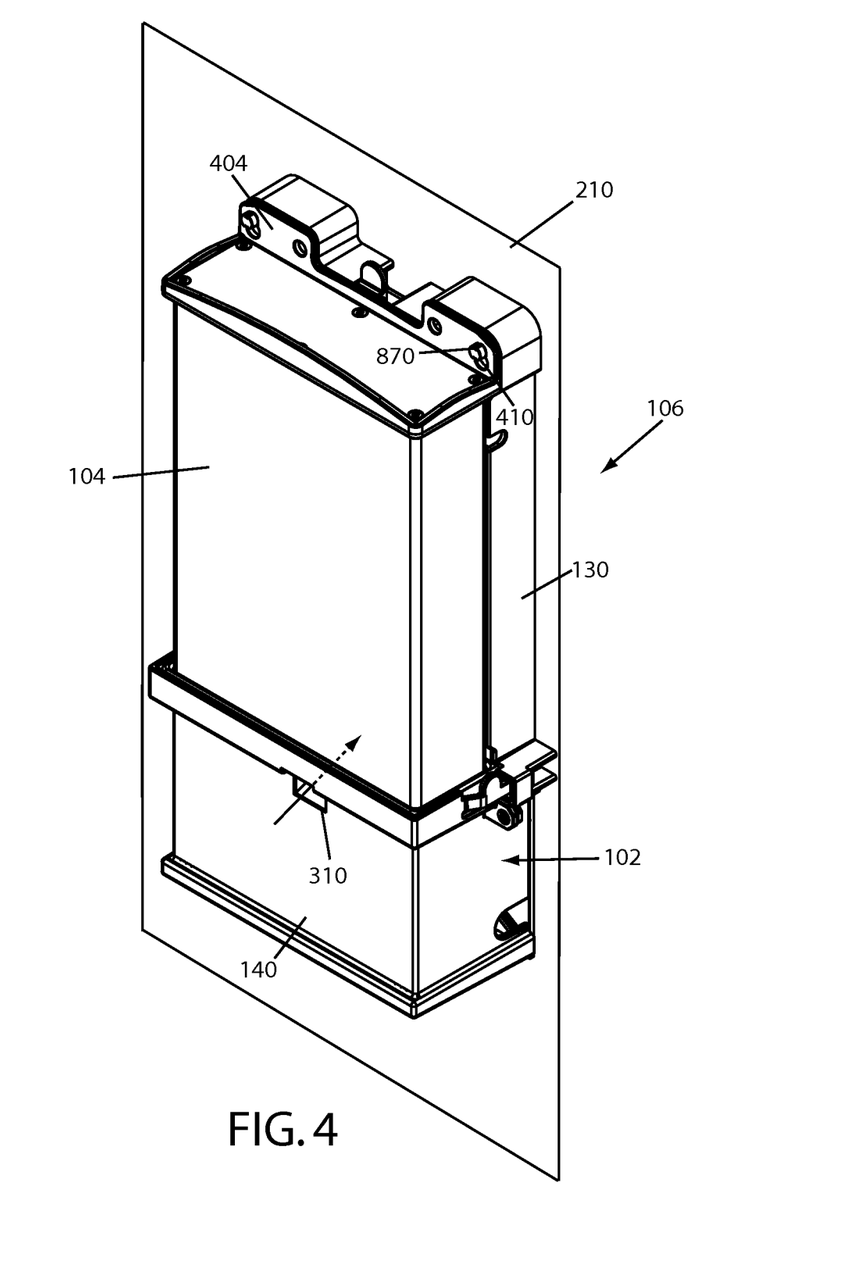
FIG. 4 illustrates an example embodiment a FOSE with the tray in an open position.

The cover 140 of the FOSE 102 may be movable between an open condition (shown in FIGS. 1 and 2) and a closed condition (shown in FIGS. 3 and 4). The tray 130 may include a cable storage area 180 configured for holding fiber optic cable for use by the FOD 104 and a splice area 190 extending in front of the face of the FOD for splicing cable. With the cover 140 in an open condition the various connectors 150, 160, 170 on the face of FOD 104, the splice area 190, and associated cables (not shown) are exposed and accessible by a technician to allow the technician to perform various services such as testing the FOD 104, splicing cable, make connections with connectors, etc.

As shown by dashed arrow in FIG. 2, the cover 140 may be moved between the open condition (FIGS. 1 and 2) in which the connectors 150, 160, 170 and the splice area 190 are accessible, and a closed condition (FIG. 3 and 4) in which the connectors 150, 160, 170 of the FOD 104 and the splice area 190 of the tray 130 are inaccessible. In the closed position, the cover 140 thereby prevents tampering of the FOD 104 and serves as a protective shield against the laser of the FOD 104 by blocking light that may be emitted laser from the various connectors and cables used with the FOD 104.

Figure 5:
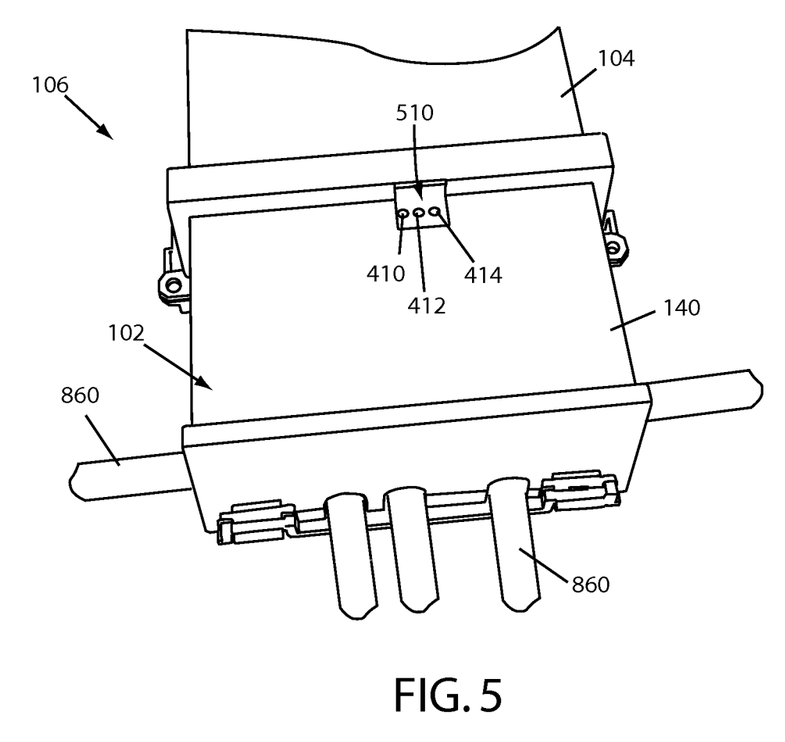
FIG. 5 illustrates an example embodiment of a FOSE coupled with a FOD in which indicators of the FD are viewable through a closed cover of the FOSE.

As shown in FIGS. 3-5, the cover 140 may include a viewer 310 that allows a user to see through the cover FOD 104 when the cover 140 is in the closed position. In an example embodiment, the viewer 310 formed of an opening in the cover 140 that is configured to provide a sight line shown by arrow in FIG. 4 to view a status indicator provided on the FOD 104 when the cover 140 is in the closed condition. For example, in the example embodiment shown in FIG. 5, the FOD 104 is in the form of an ONT that has a bank 510 of indicator lights on its face. The indicator lights may include a power on Light Emitting Diode (LED) 512 to indicate when DC power is applied to the FOD 104, a receive power LED 514 to indicate the power level of the FOD 104, and a laser on LED 516 to indicate when a device, such as a Data Over Cable Service Interface Specification (DOCSIS) device, attempts to emit upstream. It should be noted that when a laser emits upstream, then a user may be injured if the laser is directed toward the eye, such as if a user looks into the laser. The laser may be of a wavelength that is not visible to the eye thereby raising the possibility of a user inadvertently looking into a laser not realizing the potential harm.

The viewer 310 allows a user to determine the status of the FOD 104 and the status of the laser while the cover 140 is closed and shields the user from the laser. This arrangement allows a technician to determine the appropriate action required without opening the cover 140 and potentially exposing an eye to the laser. The indicators 510 of the FOD 104 may enter into various states depending upon the status of the associated components being monitored. For example, an indicator may be on, off, or blinking to indicate various status levels. For example, the Power indicator 512 may illuminate if DC power is applied to any DC connectors of the FOD 104, and the processor (not shown) in the FOD 104 is active, the receive power LED 514 may indicate various power levels received by the FOD 104, and the laser indicator 516 may illuminate when the laser is enabled.

Figure 6:
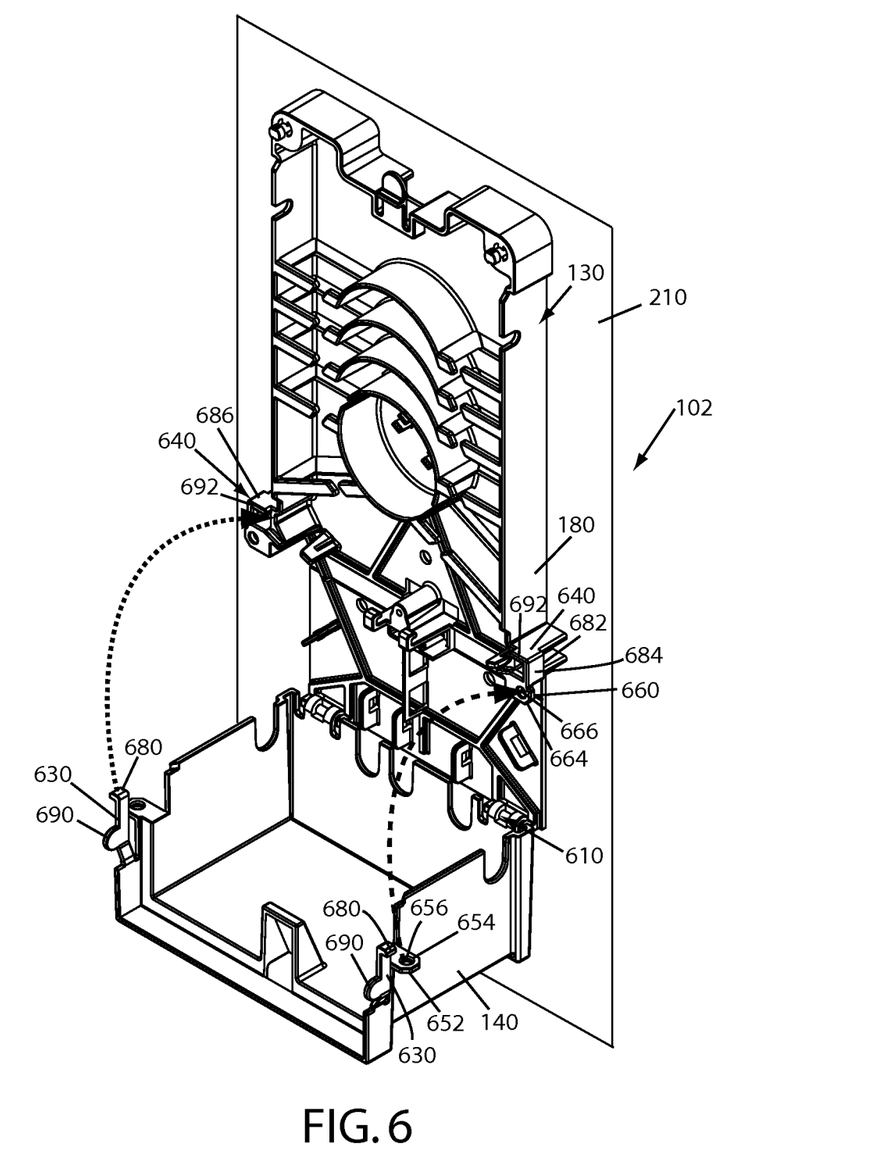
FIG. 6 illustrates a FOSE with a tray in an open condition.
Figure 7:
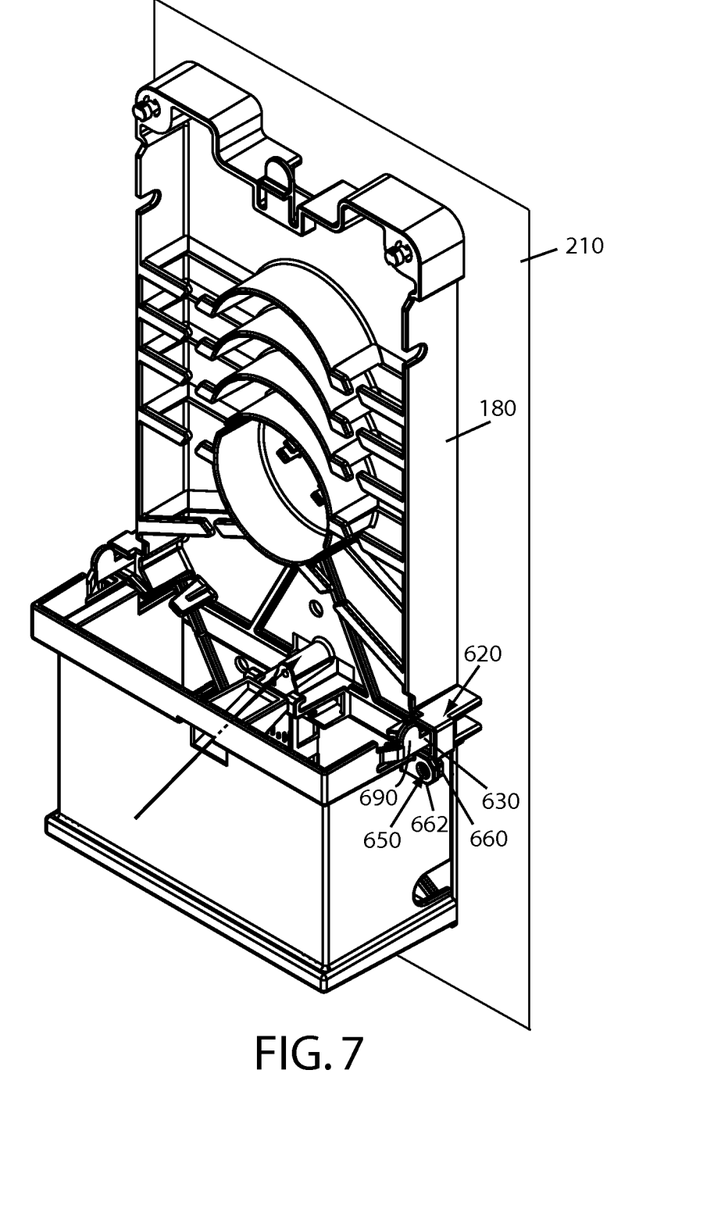
FIG. 7 illustrates the FOSE of FIG. 6 with the tray in a closed condition.

FIG. 6 shows an example embodiment of a FOSE 102 for use with a FOD 104. As discussed above, the FOSE 102 may include a fiber tray 130 and a cover 140 that is movable between an open position shown in FIG. 6 to a closed position (FIG. 7). The cover 140 may be coupled to the tray 130 by hinges 610 that allow the cover 140 to rotate and engage and disengage with the tray 130 and the FOD 104.

In the example embodiment shown in FIGS. 6 and 7, latches 620 may be provided for releasably coupling the cover 140 to the tray 130. The latches 620 may include a latch leg 630 provided on the cover 140 that is aligned with a latch receiver 640 provided on the tray 130. The latch legs 630 may include outwardly extending feet 680 sized to fit through the latch receiver 640 so that when the cover 140 is moved to a closed position (FIG. 7) the feet 680 and latch leg 630 may be inserted into the latch receiver 640 so that the latch legs 630 extend out the bottom end 682 of a sidewall 684 of the latch receiver 640. A protrusion 690 may be provided on the leg 630 for placement adjacent the top end 692 of a sidewall 686 of the latch receiver 640. The cover 140 and tray 130 are configured so that the cover 140 also engages the front of the FOD 104 in a manner that covers the splice area 190 and the connectors 150, 160, 170 of the FOD 104.

A lock assembly 650 may also be provided that includes a first lock portion 652 on the cover 140 comprising a flange 654 with an aperture 656. An associated second lock portion 660 may be provided on the tray 130 and comprise a corresponding flange 664 and aperture 666 that align with the flange 654 and aperture 656 of the cover 140 when the cover is moved to a closed position (FIG. 7). With the cover 140 in the closed position the apertures 656, 666 are aligned to allow for the insertion of the shackle of a clip or pad lock (not shown) to allow a technician to lock the cover 140 in the closed position to prevent tampering of the FOD 104 and removal of the FOD 104 from the FOSE 102.

Figure 8:
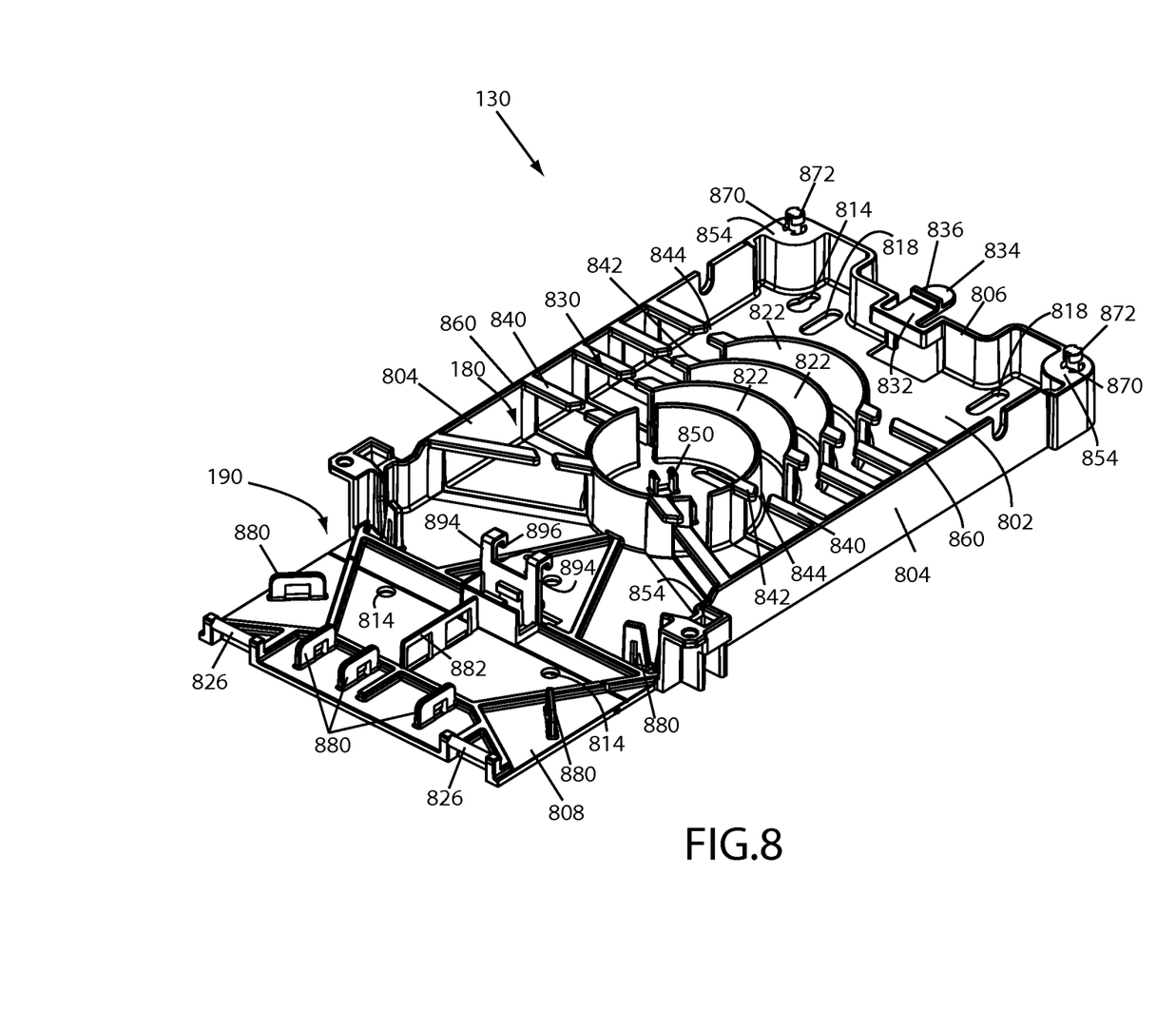
FIG. 8 illustrates a perspective view of an example embodiment of a FOSE tray.
Figure 9:
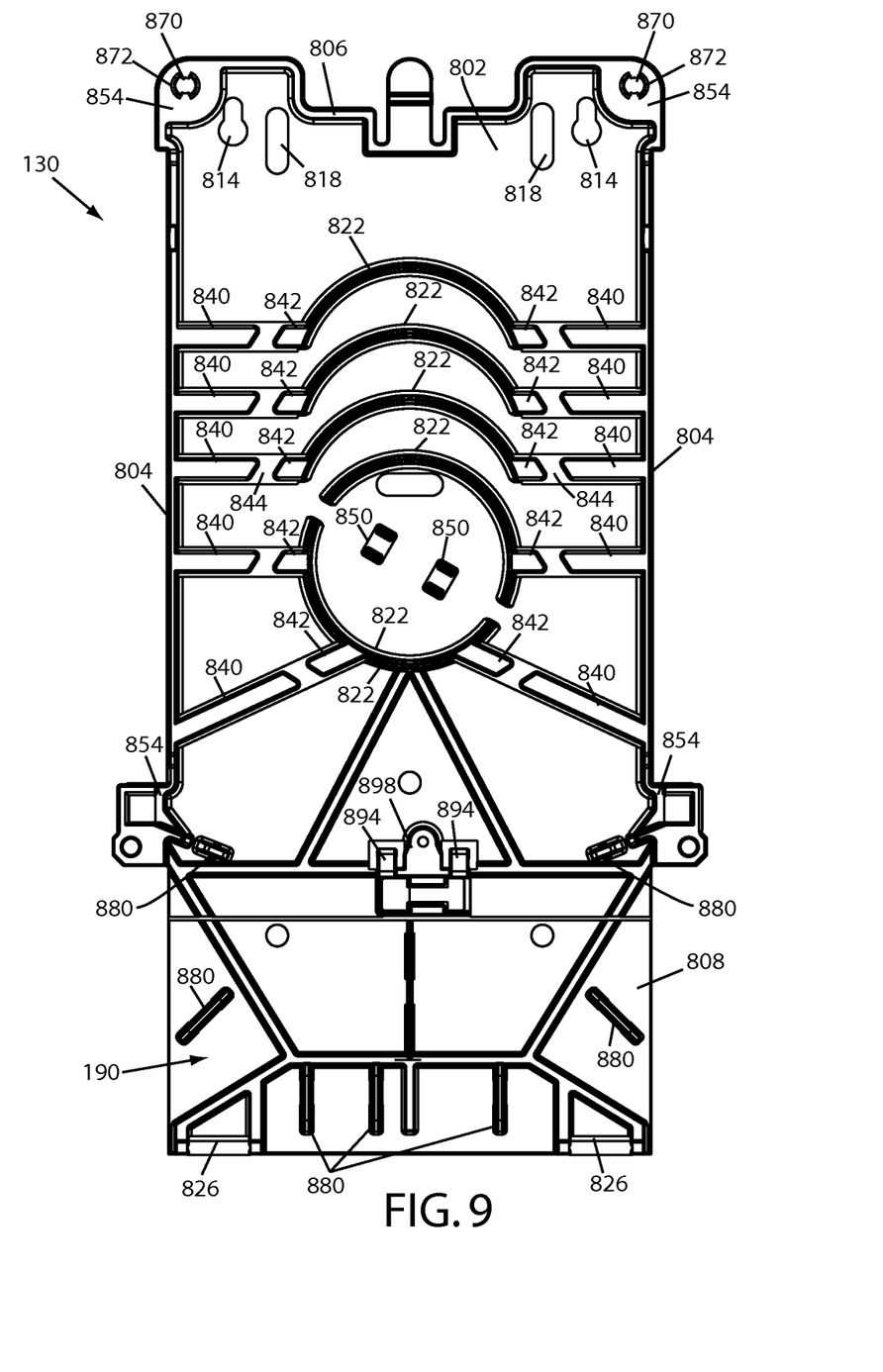
FIG. 9 illustrates a top view of the FOSE tray of FIG. 8.

In the example embodiment shown in FIG. 8, the FOSE tray 130 includes a generally planar base 802, opposing upwardly extending sidewalls 804, and an end wall 806 that together form a cable storage portion 180 of the tray 130 for storing cable. The tray 130 may also include a generally planar base extension 808 that forms a splice area 190. The cable storage area 180 may include an arrangement of spools 820 with curved upwardly extending walls 822 around which cable 860 may be wrapped (see FIG. 10). In an example embodiment, standard 0.20 inch fiber optic cable may be used. A plurality of retaining clips 830 may be provided about the spools to provide a pathway for the cable 860. The retaining clips 830 may include a plurality of major 840 protrusions extending from the sidewalls 804 of the tray and a plurality of corresponding minor protrusions 842 protrusions extending from the spool walls 822 and spaced from the major protrusions 840 to provide a gap 844 therebetween through which cable 860 may be inserted into the pathway.

Figure 10:
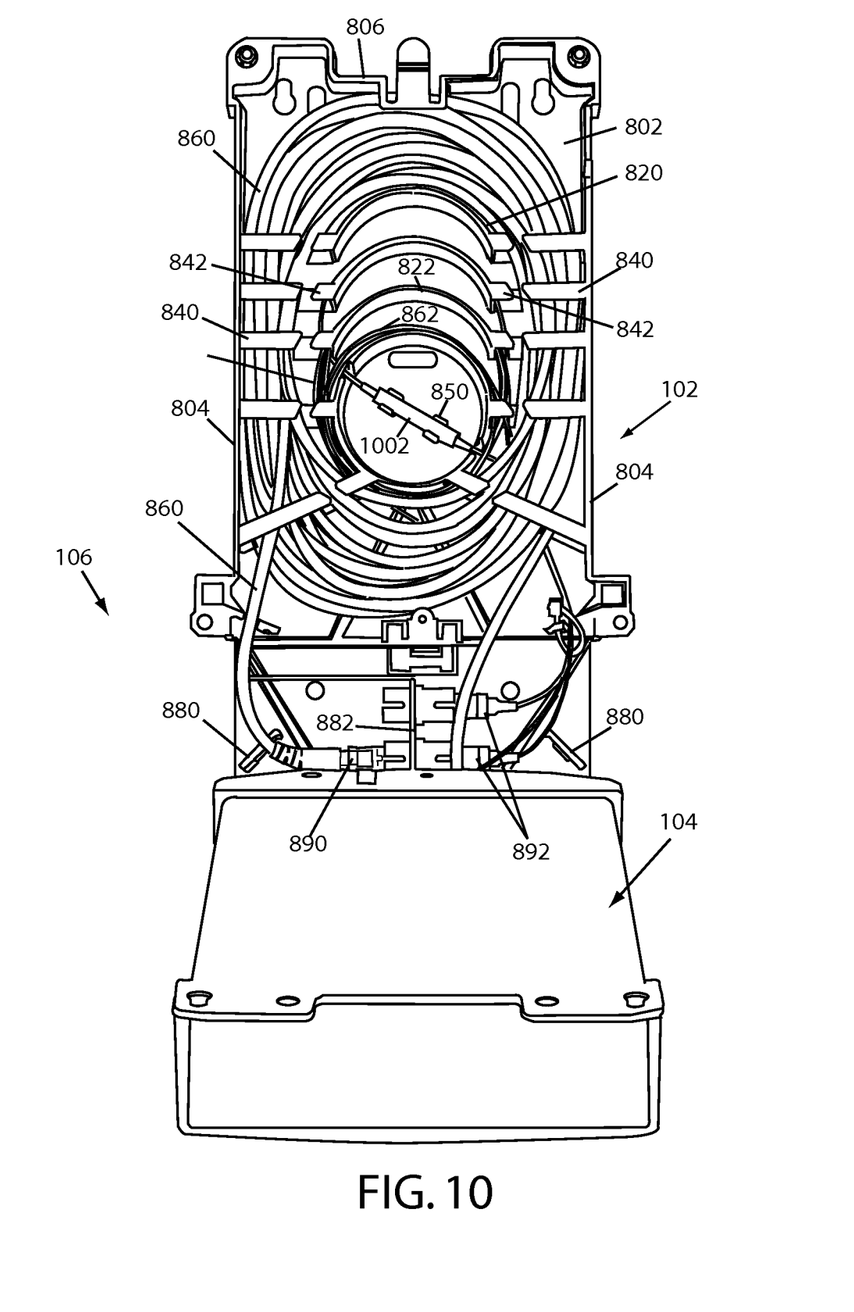
FIG. 10 illustrates a FOSE and a FOD with cable installed in the tray of the FOSE.

A technician can wind the cable 860 about the spools 820 as shown in FIG. 10. A filter clip 850 may be provided within a spool 820 to retain a device, such as a WDM filter 1002 (FIG. 10) or the like, to route additional wavelength cable to an external FOD 104. Fiber pigtails 862 may be wound unto the spools 820 and left uncoiled for attachment to the FOD 104. This allows the cable 860 to be provided to the FOSE 102 for use by the FOD 104. For example, a first technician could install and provide cable 860 to a FOSE 102 for later use by a technician installing a FOD 104.

The splice area 190 may include a raceway comprising a plurality of fiber tie points 880 and connector holders 882 for holding fiber optic connectors for splicing cable such as a connector 890 and connectors 892 (FIG. 10) may be provided in the splice area 190 and be accessible when the cover 140 is in an open condition.

The tray 130 may be configured for mounting to a mounting surface, such as to a standard structural wiring cabinet (not shown) or a wall mounting surface 210. In the example embodiment, the tray base 802 may be provided with wall mounting holes 814 and cabinet mounting holes 818 (FIGS.

9-10) that are adapted to receive a fastener for mounting the tray 130 to a wall 210 (as shown in FIGS. 2 and 4) or a cabinet (not shown).

Once the tray 130 is mounted, the FOD 104 can simply be mounted onto the tray 130 thereby alleviating the need to mount the FOD 104 to the wall 210. For example, the tray 130 may include key posts 870 provided with nodules 872 that are configured for engagement with a slotted receiving hole (FIG. 4) 410 on the FOD 104. The FOD 104 may also include additional mounting holes (not shown) through which a fastener may be inserted to further couple the FOSE 102 with the FOD 104.

The fiber tray 130 area may be sized and shaped to adjoin the housing of the FOD 104 to form a Fiber Optic Assembly 106 (FIG. 1). In an example embodiment, the FOD 104 is in the form of an ONT having front 402 and rear mounting plates 404 having mounting holes 410 for mounting the FOD 104 to a mounting surface. The tray 130 may be configured to couple with the FOD 104 and the mounting plates 402, 404 to effectively couple the FOD 104 to the tray 130. For example, a plurality of mounting surfaces 854 may be provided on the tray 130 for abutting portions of the FOD 104. In an example embodiment, the tray 130 includes a plurality of generally planar abutting surfaces 850 configured to abut a bottom of the FOD 104. For example, the upper end 860 of the sidewalls 804 of the tray 130 may serve as abutting surfaces for contacting the bottom of the FOD housing and recessed portions 854, 856 may be provided for abutting the bottom of the front 402 and rear 404 mounting plates of the FOD 104 so that the sidewalls 804 and end wall 806 may be arranged to be generally flush with the sidewalls and end walls of the FOD 104 when the FOD 104 is coupled to the FOSE 102 to form a Fiber Optic Assembly 106 thereby covering the cable storage area 180 of the tray 130 and limiting access thereto. The sidewall 804 and end wall 806 may be shaped to correspond to the shape of the FOD housing.

In a typical installation, after the FOSE 102 is mounted to a wall 210 (or cabinet) the FOD 104 may be mounted to the FOSE 102. A retainer arrangement 890 may be provided for grasping a lower flange 858 of the front mounting plate 402 of the FOD 104. The retainer 890 may comprise two curved fingers 894 having downwardly extending tips 898 that are spaced apart from a generally planar mounting surface 896 so that the flange 858 of the FOD 104 mounting plate 402 may be held between the fingers 894 and the mounting surface 898 when the FOD 104 is coupled to the tray 130.

To install the FOD 104 a technician can simply insert the leading edge of the FOD 104 mounting plate 402 between the finger tips 898 and the mounting surface 896 and insert the rear posts 870 of the tray 130 through the outer mounting slots 410 of the FOD 104. For example, a technician may open the tray cover 140 so that the cover 140 hangs down against the mounting surface 210. The FOD 104 may be positioned over the FOSE 102 with the connectors 150, 160, 170 of the FOD 104 pointing downward with the posts 870 of the fiber tray 130 aligned with the keyed holes 410 at the back of the FOD 104. The FOD 104 may be pushed onto the posts 870 and past the post nodules 872 until the FOD 104 rests against a plurality of contact surfaces 854 of the tray 130. The FOD 104 may be pushed downward to overcome the spring tension from the top-mounted locking tab 876 of the fiber tray 130 to slide the FOD 104 downward and into place so that the bottom flange of the FOD 104 will be captured by the finger guides of the tray. A fastener (not shown) may be inserted through the center hole 888 of the bottom unit.

In the mounted position, the posts 870 extend through the outer mounting holes 410 of the FOD 104 of the rear mounting plate 404. A rear mounting tab 832 may be provided that includes a mounting surface 834 upon which a portion of the rear mounting plate 404 of the FOD 104 may be placed and an upwardly extending protrusion 836 against which the end of the rear mounting plate of the FOD 104 may abut. The FOD 104 is thus coupled to the FOSE 102 which in turn is mounted to the wall 210.

As discussed above, the tray 130 may be provided with cable 860 prior to the mounting of the FOD 104 to the tray 130. For example, a first technician may mount the tray 130 to a wall at the premises and provide cable 860 to the cable storage area 180 of the tray 130. Later a second technician may install the FOD 104 atop the tray 130 and use the cable 860 stored in the tray 130 for making various connections with the FOD 104. In the example embodiment, the tray 130 may store 30 feet of cable for use by the FOD 104. This allows a technician installing the FOSE 102 to provide a sufficient length of cable 860 for later use by a technician installing the FOD 104 by mounting it to the FOSE 102. As mentioned above, the tray 130 may be configured for coupling to a movable cover 140. For example, the tray 130 may include hinge pins 826 for coupling with the cover 140.

The FOD 104 may include a plurality of components and associated RF connectors that may be covered and uncovered by the cover 140. For example, the FOD 104 may include power connectors, ports, and the like, for use by the technician. In the example embodiment shown in FIG. 1, the FOD 104 includes a laser output 162 with a laser connector, such as a fiber optic connector SC/APC 160, an RF connector port 152 with an F connector 150, spring loaded terminal lugs 156, an RF port to the residence 170, and an RF test port 174, such as a −10 dB RF test port (with terminator installed) for connection to a test modem.

Figure 11:
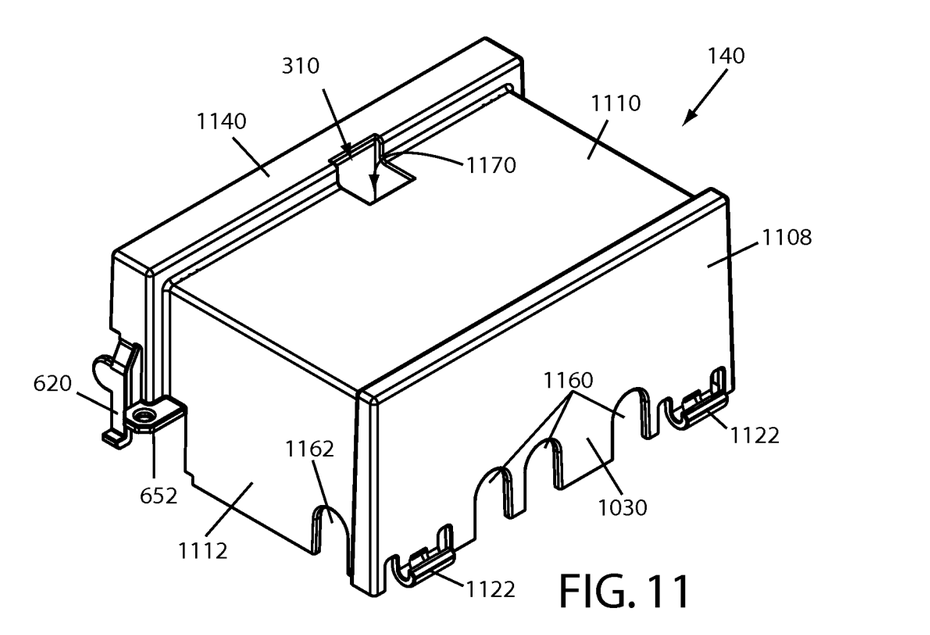
FIG. 11 illustrates a perspective view of an example embodiment of a FOSE cover for use with a FOSE tray.

FIG. 11 shows a perspective view of a cover 140 for use with the fiber tray 130 and the FOD 104. The cover may include a front wall 1108, opposing sidewalls 1110, and a top wall 1112 that form an enclosure for covering the splice area 190 of the tray 130 and the connectors 150, 160, 170 of the FOD 104. The cover 140 may include a plurality of cable access openings for receiving cable 860 that may be provided to the tray 130 and the FOD 104. In the example embodiment, three access openings 1160 are provided in the front wall 1108 of the cover 140 and an opening 1162 in each sidewall 1110. The top wall 1110 and sidewalls 1112 may have a lip 1140 portion that together forms a mouth 1150 for coupling with a front of the FOD 104.

Hinge extensions 1112 may extend from the front wall 1108 of the cover 140 that are configured to snap to hinge pins 826 of the fiber tray 130 to form hinges 610 (FIG. 6) that allow the cover 140 to rotate between a closed position in which connectors of the FOD 104 and the splice area 190 of the tray 130 are not accessible and an open position in which the FOD connectors and the splice tray 190 are accessible. As discussed supra, the cover 140 may include latches 620 and lock portions 652 for engaging latch receivers 640 and the lock portions 660 of the fiber tray 130 when the cover 140 is moved to the closed position. When in the closed position the cover 140 acts as a shield against the laser of the FOD 104.

Figure 12:
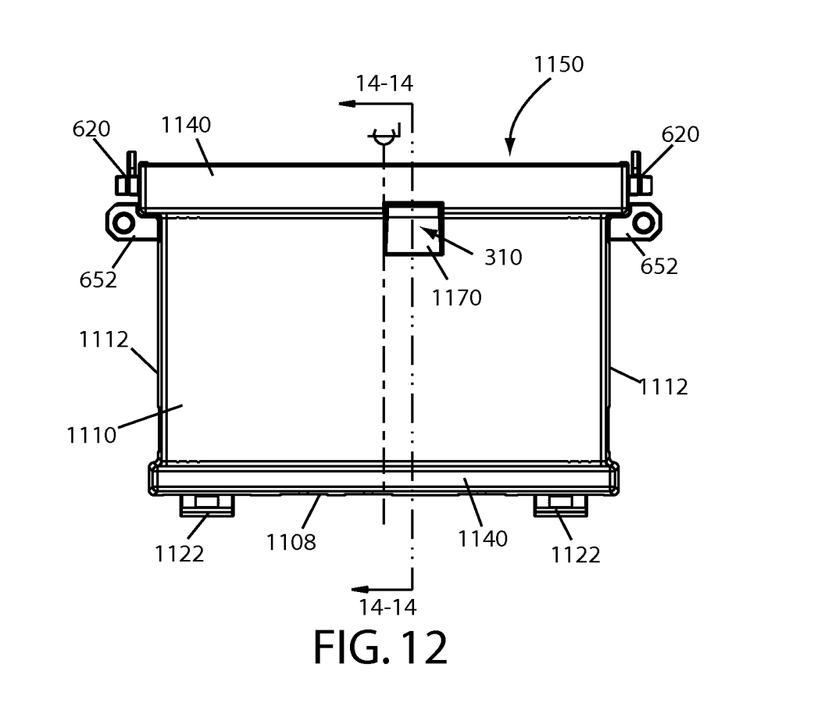
FIG. 12 illustrates a top view of the cover of FIG. 11.
Figure 13:
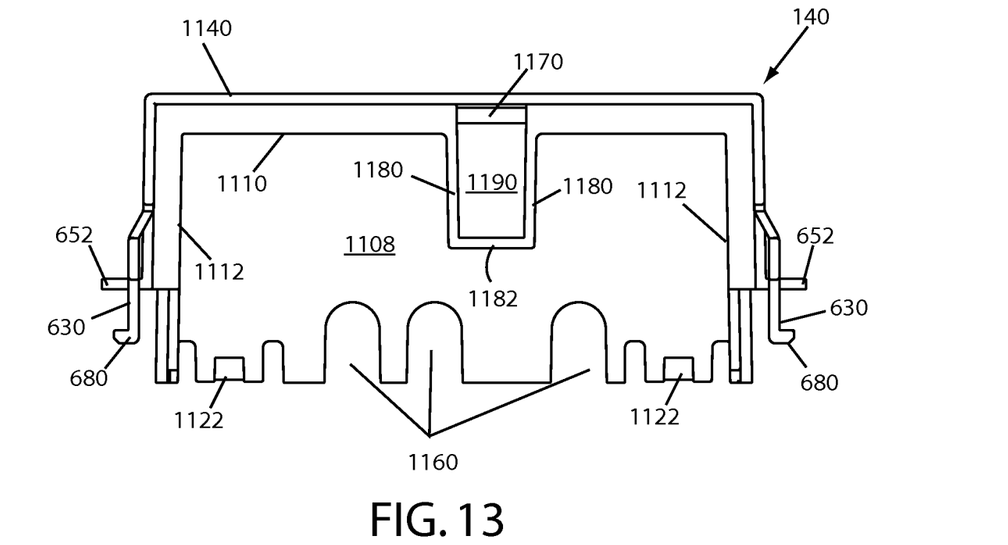
FIG. 13 shows a rear view of the cover of FIG. 11.
Figure 14:
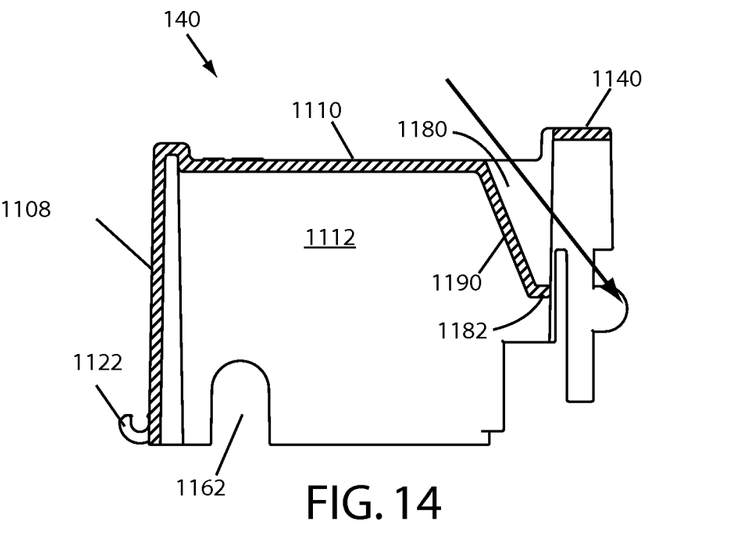
FIG. 14 shows a cut-away view of the cover of FIG. 12 along cut line 14-14.

Although the cover 140 acts as a shield against the laser when in the closed position, the cover 140 may include a viewer 310 that allows a user to view a portion of a FOD 104 to which the cover 140 is coupled. In an example embodiment, the viewer 310 may be a passageway formed of an opening 1170 in the top wall 1110 and lip 1140 of the cover 140, an angled center wall 1190, two sidewalls 1180, and a base wall 1182. The center wall 1190, sidewalls 1180 and base wall act as a shield about the opening 1170 to prevent the laser from potentially being directed through the viewer. As shown in FIG. 12, the viewer 310 may be off center of the centerline CL of the cover 140 to prevent a laser from the laser connector 160 from emitting light through the viewer 310 and to align with indicators 510 provided on the FOD 104 (FIG. 5) to allow viewing of the indicators 510. This allows a user to safely determine the status of the FOD 104 without being exposed to the laser.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

What is claimed is:

1. An apparatus, comprising:
a fiber tray configured for coupling with a fiber optic device having a connector, wherein the fiber tray has a top portion and a bottom portion, wherein the top portion includes mounting plates for removably coupling the fiber optic device to the fiber tray and a cable storage area that includes an arrangement of spools for storing cable, and wherein the bottom portion only includes the connector when the fiber optic device is attached to the fiber tray, wherein the fiber optic device is an optical network terminal; and
a bottom cover movably coupled to the bottom portion of the fiber tray, wherein the bottom cover does not cover the top portion of the fiber tray, the bottom cover configured to move between a closed position to cover the connector and the bottom portion of the fiber tray and an open position to uncover the connector and the bottom portion of the fiber tray such that the bottom cover allows access to the bottom portion of the fiber tray and the connector and does not allow access to the top portion of the fiber tray, wherein the fiber optic device includes a laser connector and wherein the bottom cover is configured to cover the laser connector in the closed position and the bottom cover further includes a viewer configured to allow viewing of the laser connector with the bottom cover in the closed position.

2. The apparatus of claim 1, wherein said fiber optic device includes a laser aperture and wherein the bottom cover is configured to cover the laser aperture in the closed position.

3. The apparatus of claim 1, wherein the viewer is configured to allow viewing of an indicator of the fiber optic device with the bottom cover in a closed position, wherein the indicator is located inside the viewer.

4. The apparatus of claim 1, wherein the fiber tray is configured to house cable for use by the fiber optic device and to couple with a housing of the fiber optic device.

5. The apparatus of claim 4, wherein the fiber tray is configured to couple to a bottom of the fiber optic device housing.

6. The apparatus of claim 1, wherein the fiber tray is configured for mounting on a mounting surface and configured to couple with the fiber optic device to cover a portion of the tray.

7. The apparatus of claim 1, wherein the bottom portion includes a cable splice area.

8. The apparatus of claim 1, wherein the bottom cover is configured to cover a splice area of the fiber tray when the bottom cover is in the closed position and uncover the splice area of the fiber tray in the open position.

9. The apparatus of claim 1, further comprising a latch to releasably couple the bottom cover to the fiber tray.

10. The apparatus of claim 1, further comprising means for locking the bottom cover to the fiber tray in the closed position.

11. The apparatus of claim 1, further comprising the fiber optic device having an indicator viewable through the bottom cover.

12. An apparatus, comprising:
a fiber optic storage enclosure, comprising a fiber tray, wherein the fiber tray has a top portion, a bottom portion, and a bottom cover located at the bottom portion of the fiber tray, wherein the top portion includes a cable storage area that includes an arrangement of spools for storing cable, wherein the bottom portion includes a splicing area for splicing cable, and wherein the bottom cover does not cover the top portion of the fiber tray; and
a fiber optic device having a laser aperture at the bottom portion of the fiber tray, wherein the fiber tray includes mounting plates for removably coupling the fiber optic device to the fiber tray to form an optical network terminal, wherein the fiber optic device is an optical network terminal, wherein the bottom cover is movable between a closed condition to cover the laser aperture and an open condition to uncover the laser aperture such that the bottom cover allows access to the bottom portion of the fiber tray and the connector and does not allow access to the top portion of the fiber tray, wherein the fiber optic device includes a laser connector and wherein the bottom cover is configured to cover the laser connector in the closed position and the bottom cover further includes a viewer configured to allow viewing of the laser connector with the bottom cover in the closed position.

13. The apparatus of claim 12, further comprising a latch to releasably couple the bottom cover to the fiber tray in a closed position.

14. The apparatus of claim 12, further comprising means for locking the bottom cover to the fiber tray.

15. The apparatus of claim 12, wherein the bottom cover has a cable access opening for receiving cable through the bottom cover.

16. The apparatus of claim 13, wherein the bottom cover is configured to cover a splice area of the fiber tray.

17. The apparatus of claim 1, wherein the bottom cover allows access to only the bottom portion of the fiber tray.

18. A method comprising:
mounting a fiber optic storage enclosure on a wall, wherein the fiber optic storage enclosure includes a fiber tray and the fiber tray includes a top portion and a bottom portion, wherein the top portion includes mounting plates for removably coupling a fiber optic device to the fiber tray and a cable storage area that includes an arrangement of spools for storing cable, and wherein the bottom portion includes a rotatable lid that can rotate on a bottom hinge of the mounting fiber optic storage enclosure, wherein the fiber optic device includes a laser connector and wherein the bottom portion is configured to cover the laser connector in the closed position and the bottom cover further includes a viewer configured to allow viewing of the laser connector with the bottom cover in the closed position;
inserting the fiber optic device into the top portion of the fiber tray, wherein the fiber optic device covers the cable storage area, and wherein connectors on the fiber optic device extend into the bottom portion and the rotatable lid can rotate between an open position that allows access to the connectors and to a closed position that covers the connectors.

19. The apparatus of claim 1, wherein the viewer is located in a to half of the bottom cover and is angled towards the laser connector.

\* \* \* \* \*